US012064725B1

(12) United States Patent
Jang et al.

(10) Patent No.: US 12,064,725 B1
(45) Date of Patent: Aug. 20, 2024

(54) AIR-LIQUID CONTACTOR FOR CARBON DIOXIDE DIRECT AIR CAPTURE USING AQUEOUS SOLVENT

(71) Applicant: UT-Battelle, LLC, Oak Ridge, TN (US)

(72) Inventors: Gyoung Gug Jang, Oak Ridge, TN (US); Radu Custelcean, Oak Ridge, TN (US); Constantinos Tsouris, Oak Ridge, TN (US); Abishek Kasturi, Atlanta, GA (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 8 days.

(21) Appl. No.: 18/369,290

(22) Filed: Sep. 18, 2023

Related U.S. Application Data

(60) Provisional application No. 63/454,979, filed on Mar. 28, 2023.

(51) Int. Cl.
*B01D 53/02* (2006.01)
*B01D 53/14* (2006.01)
*B01D 53/18* (2006.01)

(52) U.S. Cl.
CPC ..... *B01D 53/1475* (2013.01); *B01D 53/1493* (2013.01); *B01D 53/185* (2013.01); *B01D 2252/20494* (2013.01); *B01D 2257/504* (2013.01)

(58) Field of Classification Search
CPC .......... B01D 53/1475; B01D 53/1493; B01D 53/185; B01D 2252/20494; B01D 2257/504
See application file for complete search history.

(56) References Cited

U.S. PATENT DOCUMENTS

| 9,636,628 B2 * | 5/2017 | Higashii ............ B01D 53/1475 |
| 2019/0344217 A1 | 11/2019 | Heidel et al. |
| 2022/0176312 A1 | 6/2022 | Olmstead et al. |
| 2022/0193606 A1 | 6/2022 | Nold et al. |
| 2022/0395806 A1 | 12/2022 | Koch-Glitsch |

FOREIGN PATENT DOCUMENTS

CN 218188833 U * 1/2023

OTHER PUBLICATIONS

Translation of CN-218188833; Qi (Year: 2023).*

(Continued)

*Primary Examiner* — Christopher P Jones
(74) *Attorney, Agent, or Firm* — WARNER NORCROSS + JUDD LLP

(57) ABSTRACT

A high-flux direct air capture (DAC) contactor is provided. The contactor includes stainless steel mesh elements interlaced into a structured packing to increase the effective surface area for a suitable solvent. In laboratory testing, the contactor demonstrated significant potential in driving down the cost of solvent absorption-based DAC due to its high specific surface area and $CO_2$ uptake efficiency, resistance to corrosion, optimal wettability, smaller relative size, and low manufacturing cost. As a potential breakthrough strategy, the highly efficient $CO_2$ capture contactor can be employed to significantly reduce capital costs in a compact DAC system.

20 Claims, 3 Drawing Sheets

(56) References Cited

OTHER PUBLICATIONS

Lin et al., "Evaluation of Alkanolamine Solutions for Carbon Dioxide Removal in Cross-Flow Rotating Packed Beds", Journal of Hazardous Materials, vol. 175, pp. 344-351 (2010).
Kasturi et al., "An Effective Air-Liquid Contractor for CO2 Direct Air Capture Using Aqueous Solvents", Separation and Purification Technology 324, 124398 (2023).
Sanz-Perez et al., "Direct Capture of CO2 from the Ambient Air", Chem Rev. 116(19), 11840-11876 (2016).
Keith et al., "A Process for Capturing CO2 From the Atmosphere" Joule 2.8, 1573-1594 (2018).

* cited by examiner

AIR-LIQUID CONTACTOR FOR CARBON DIOXIDE DIRECT AIR CAPTURE USING AQUEOUS SOLVENT

CROSS-REFERENCE TO RELATED APPLICATIONS

This application claims the benefit of U.S. Provisional Application 63/454,979, filed Mar. 28, 2023, the disclosure of which is incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to the capture and utilization of carbon dioxide, and more particularly to an air-liquid contactor for solvent-based direct air capture of carbon dioxide.

BACKGROUND OF THE INVENTION

Direct air capture (DAC) is a process involving the separation of $CO_2$ from air directly. Captured air is first passed through a sorbent or a solvent having a high affinity for $CO_2$. Once saturated with $CO_2$, the sorbent or the solvent must be regenerated, causing a release of $CO_2$ molecules for storage and reprocessing. While DAC is highly scalable and modular, this process is currently extremely cost intensive in practice. Currently, all known sorbents and solvents face significant penalties in their regeneration. In addition, while many researchers have demonstrated $CO_2$ conversion to ethanol, methanol, and sustainable aviation fuels, these pathways are not yet economical on a large scale. Despite the current barriers in cost and energy, however, DAC remains an extremely promising technology for two reasons. First, the positioning of DAC plants is extremely flexible and allows for the use of low-value arid land to sequester large amounts of $CO_2$ per unit area of land. Second, the modularity of DAC systems allows for the rapid scale up once a promising material for the utilization of captured $CO_2$ has been developed.

The liquid-air contactor is the heart of a solvent-based DAC system. The liquid-air contactor brings ambient air into contact with an aqueous capture solution. The capture of $CO_2$ occurs at the surface of a falling solvent film through structured packing through which air flows horizontally in a cross-flow configuration. The transport of $CO_2$ into the solvent is limited by a reaction-diffusion process occurring in the liquid falling film, and the $CO_2$ flux depends on the effective surface area. Therefore, well-wetted structured surfaces of a high surface-area-to-volume ratio and a relatively low pressure drop are desirable in efforts to achieve a high $CO_2$ transfer rate (>50%). A commercial cooling tower technology can be adopted for a DAC application, but contactor designs for $CO_2$ capture from air could be different from traditional packed towers due to the very dilute nature of $CO_2$. Also, for large-scale contactors, light-weight materials such as plastics could be beneficial for reduced construction costs, but the intrinsic hydrophobic surface features of plastics limit their effective surface area and require pre-treatments for improved wettability. Inorganic random packing elements and metal packing elements can increase wettability, but these options are not attractive because of high cost and scalability issues.

Accordingly, there remains a continued need for an improved DAC system for the removal of $CO_2$ from ambient air. In particular, there remains a continued need for an improved air-liquid contactor for solvent-based DAC systems.

SUMMARY OF THE INVENTION

A high-flux DAC contactor is provided. The contactor includes stainless steel mesh filler interlaced into a structured packing to increase the effective surface area for a suitable DAC solvent. In laboratory testing, the contactor demonstrated significant potential in driving down the cost of solvent absorption-based DAC due to its high specific surface area and $CO_2$ uptake efficiency, resistance to corrosion, optimal wettability, smaller relative size, and low manufacturing cost. As a potential breakthrough strategy, the highly efficient $CO_2$ capture contactor can be employed to significantly reduce capital costs in a compact DAC system.

In one embodiment, the air-liquid contactor harvests $CO_2$ from a dilute source, such as atmospheric air or ambient air, yielding a $CO_2$-lean gas. The air-liquid contactor includes a structured packing that provides a horizontal gas flow path and a vertical solvent flow path. The structured packing includes a grated inlet and outlet (e.g., a honeycomb structure) and a plurality of corrugated plates disposed vertically therebetween. Metal mesh filler is disposed in the horizontal gas flow path, extending from the inlet side to the outlet side, and includes fine metal wire(s) that is/are interwoven or interlaced into a three-dimensional geometry, for example an irregular spheroid or ellipsoid. The structured packing includes a plurality of vertical channels between the corrugated plates, such that a solvent film can flow vertically through metal mesh filler contained within the vertical channels (via the vertical solvent flow path) and be widely distributed over the metal (e.g., stainless steel) mesh filler. Alternatively, the structured packing can comprise a three-dimensional lattice structure with metal mesh filler disposed therein.

As discussed herein, the metal mesh filler increases the effective surface area of the structured packing for $CO_2$-solvent contact, while being highly corrosion resistant, lightweight, and relatively inexpensive with excellent wetting characteristics. The high-flux DAC contactor demonstrated a two-times higher $CO_2$ capture efficiency (about 60%) compared to structured packing lacking metal mesh filler elements (about 30%) with a negligible pressure drop. In another embodiment, the high-flux DAC contactor is disposed above a collection basin. Solvent collected in the collection basin (for example, potassium sarcosinate) can be regenerated and/or recirculated as desired. A distribution basin is disposed above the high-flux DAC contactor and a suction source such as a fan draws atmospheric air or ambient air laterally through the air-liquid contactor. The suction source draws $CO_2$-laden air in a crossflow configuration relative to the solvent, such that the solvent flows vertically in a direction perpendicular to the flow of $CO_2$-laden air.

These and other features and advantages of the present invention will become apparent from the following descrip-

DETAILED DESCRIPTION OF THE CURRENT EMBODIMENT

As discussed herein, the current embodiment relates to a high flux air-liquid contactor for solvent-based direct air capture systems. The air-liquid contactor harvests $CO_2$ from a dilute source, such as atmospheric air or ambient air, yielding a $CO_2$-lean gas. While described below in relation to a DAC system having a cross-flow configuration, the air-liquid contactor of the present invention can be used in connection with other configurations, including counter-flow configurations in which the $CO_2$-laden air moves in a direction opposite of the DAC solvent.

Figure 1:
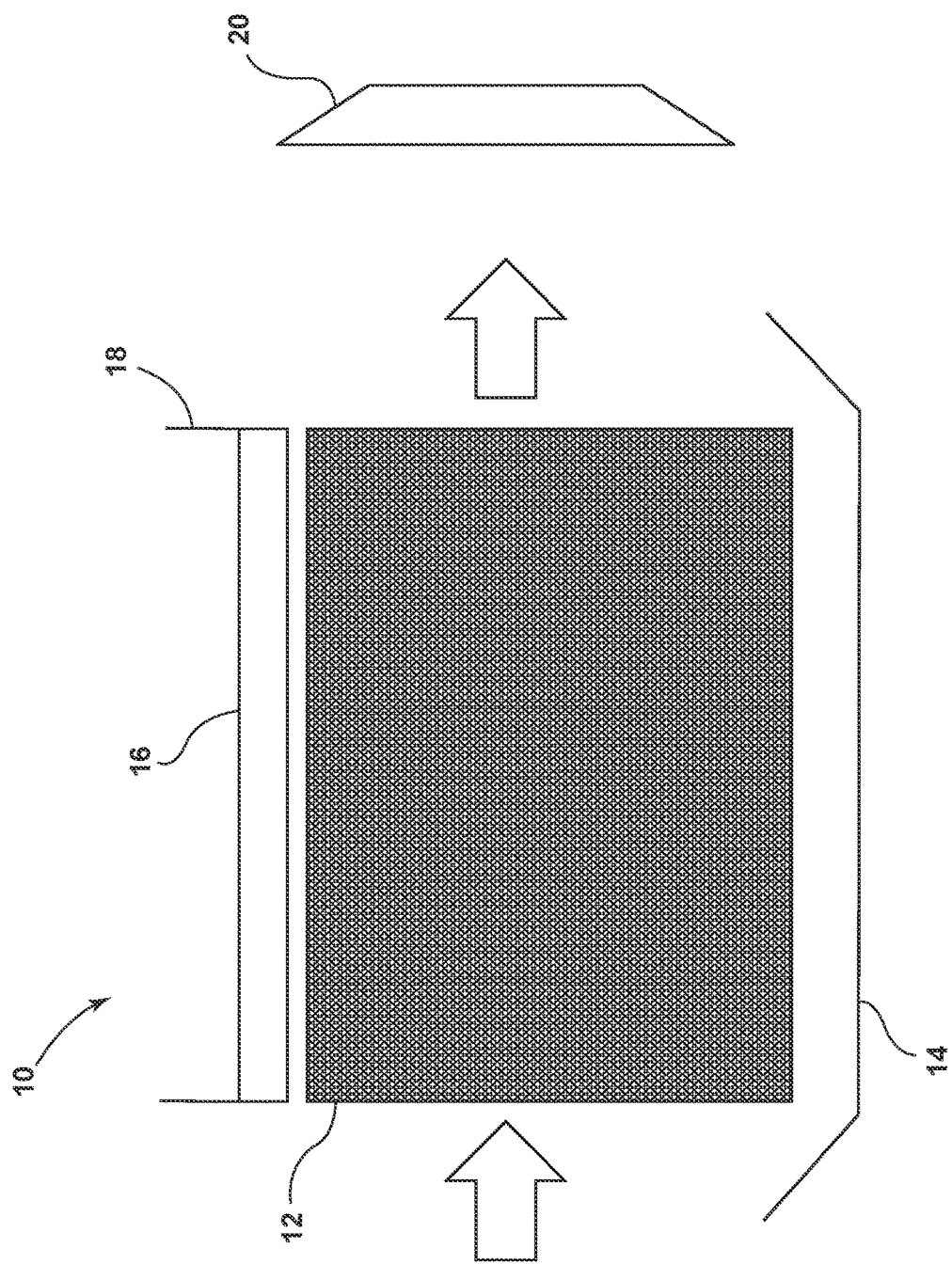
FIG. 1 is a schematic illustration of a direct air capture system including the high flux air-liquid contactor of the present invention.

Referring first to FIG. 1, a DAC system including the air-liquid contactor of the present invention is illustrated and generally designated 10. The DAC system 10 includes an air-liquid contactor 12 disposed above a collection basin 14. The DAC system 10 also includes a header 16 and a distribution basin 18 disposed above the air-liquid contactor 12 and a suction source 20 such as a fan for drawing atmospheric air or ambient air laterally through the air-liquid contactor 12. The suction source 20 draws $CO_2$-laden air in a crossflow configuration relative to the solvent, such that the solvent flows vertically in a direction perpendicular to the flow of $CO_2$-laden air. The solvent collected in the collection basin 14 can be regenerated and/or recirculated as desired. While only a single air-liquid contactor 12 is shown in FIG. 1, other embodiments include a plurality of air-liquid contactors disposed serially in the air flow path.

The air-liquid contactor 12 includes a three-dimensional structured packing, for example a block or a cuboid. As the $CO_2$-laden air is circulated through the packing, for example being drawn through the packing by the suction source 20, the $CO_2$-laden air contacts a solvent flowing vertically through the packing. By contacting these two fluids, $CO_2$ within $CO_2$-laden air is transferred to the solvent. The solvent is optionally an aqueous amine or amino acid solution, for example potassium sarcosinate (K-SAR), having good $CO_2$ loading (mol $CO_2$ per mol amine). Other solvents can be used in other embodiments, for example sodium salts of amino acids.

Figure 2:
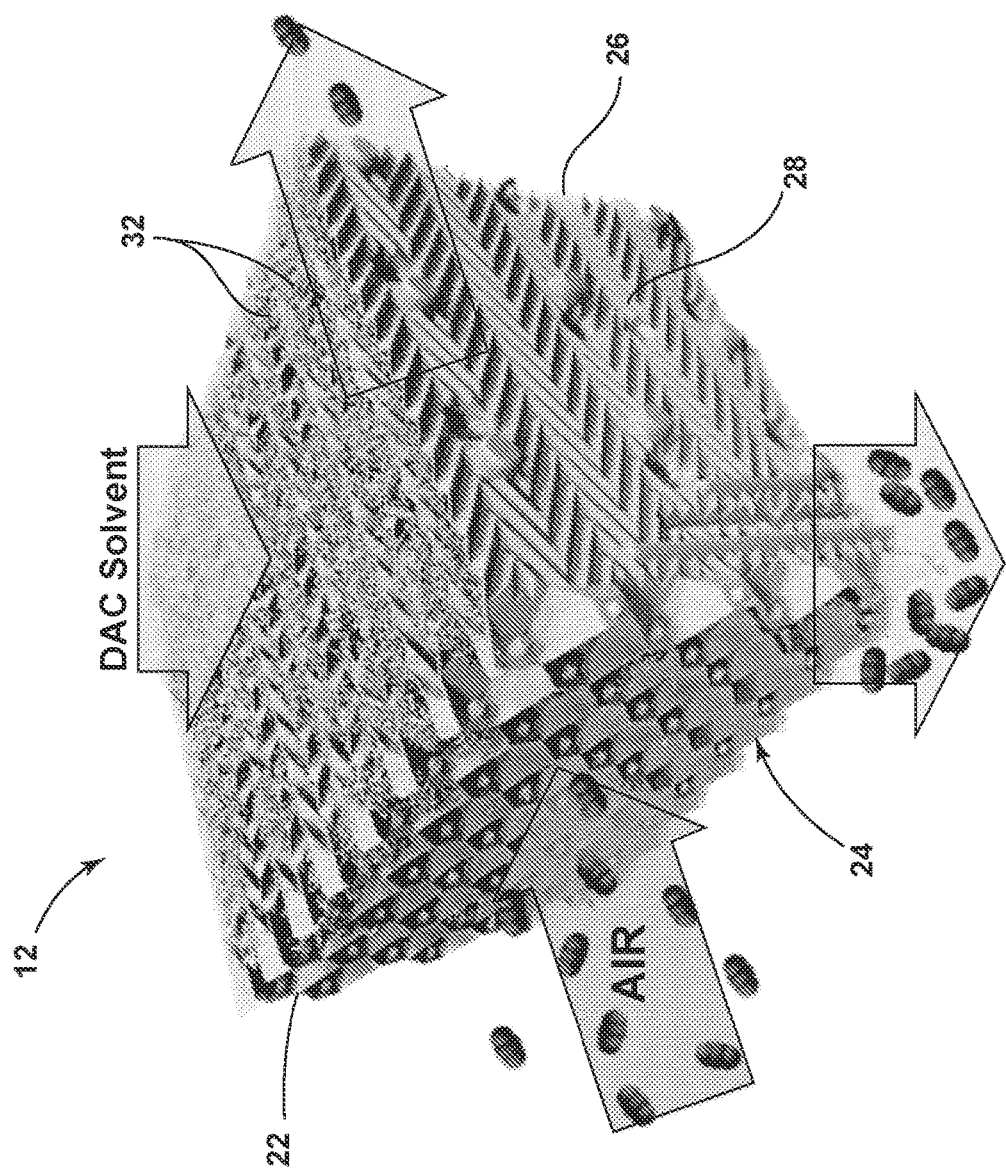
FIG. 2 is a perspective view of the high flux air-liquid contactor of the present invention including stainless steel scrubbers within channels in a structured packing.

Referring now to FIG. 2, the air-liquid contactor 12 is further illustrated. The air-liquid contactor 12 includes the aforementioned three-dimensional structured packing 22. The structured packing 22 is formed of polyvinylchloride in the illustrated embodiment, being lightweight but hydrophobic. Other materials can be used in other embodiments, including for example other polymeric and non-polymeric materials. The structured packing 22 provides a horizontal gas flow path and a vertical solvent flow path. For example, the structured packing 22 includes a grated inlet 24, a grated outlet 26, and a plurality of corrugated plates 28 disposed vertically therebetween. The corrugated plates 28 provide a high surface area while allowing for good (horizontal) gas flow and good (vertical) liquid flow.

In some embodiments, the structured packing 22 will be present to guide the random packing of metal mesh filler. In other embodiments, the structured packing can be removed, and only random packing with metal mesh filler can be packed in a unit 'box' to allow solvent to flow vertically and air to flow horizontally. Multiple 'boxes' packed with metal mesh filler can be appropriately stacked together to scale up the air-liquid contactor. The packing density of the metal mesh filler, i.e., the volume of solid material over the total volume of solid material plus the volume of the internal voids between adjacent metal mesh fiber(s), can range between 1% and 30%, inclusive, further optionally between 2% and 4%, inclusive, further optionally 3%. As used herein, "inclusive" means including the upper and lower bounds of the stated range.

Figure 3:
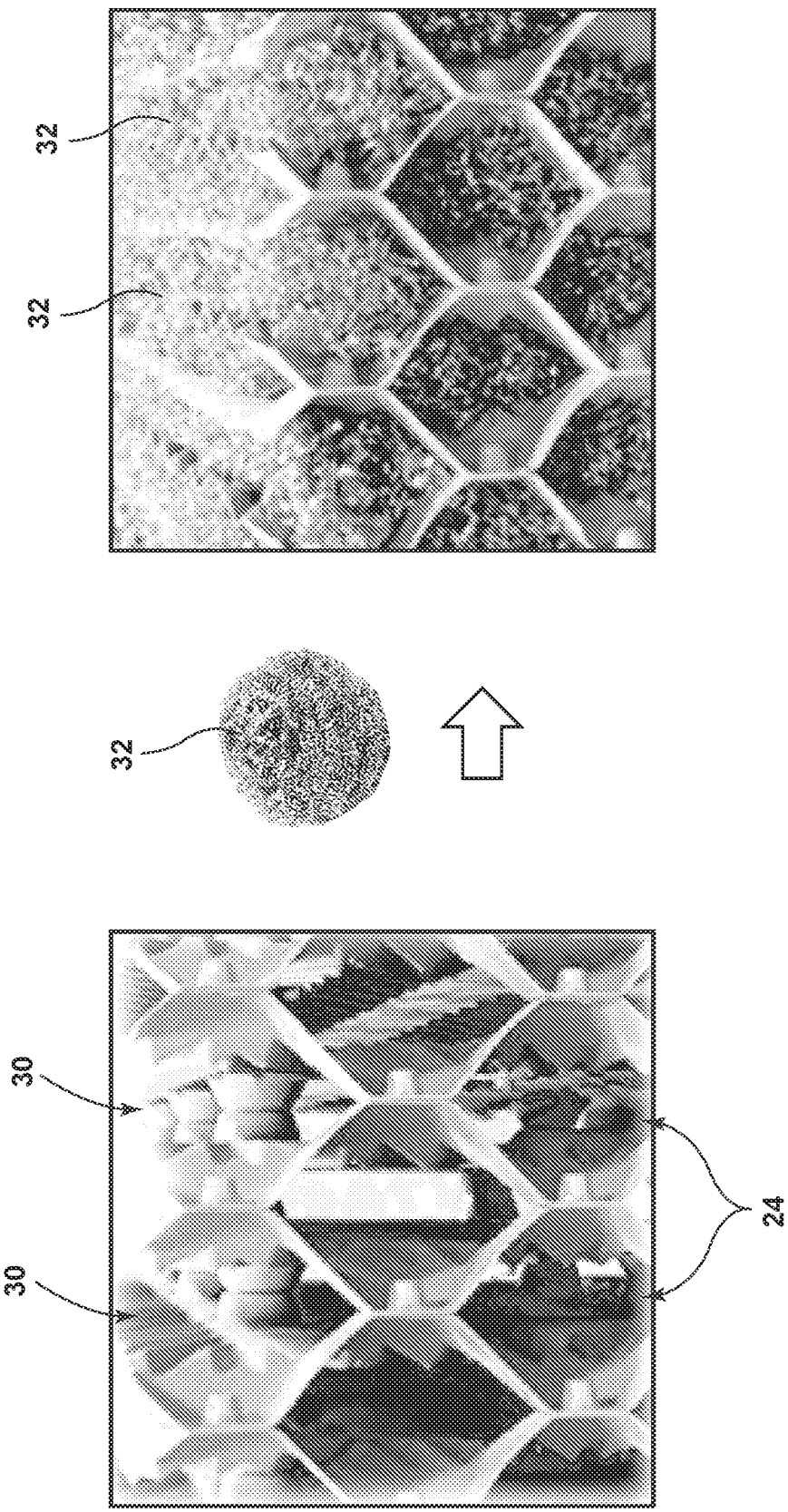
FIG. 3 is a side view of the air-liquid contactor of the present invention including stainless steel scrubbers within channels in a structured packing.

As shown in FIG. 3, the structured packing includes a series of vertical channels 30 that are defined between adjacent ones of the corrugated plates 28. The vertical channels 30 define a vertical solvent flow path, such that the solvent can flow vertically through the structured packing 22 and be widely distributed over a broader surface area of the structured packing 22. The air-liquid contactor 12 also includes metal mesh filler 32 interlaced into the structured packing to increase the effective surface area of the solvent. The metal mesh filler 32 comprises a plurality of 410 stainless steel scrubbers in the illustrated embodiment, but can be comprised of other materials in other embodiments. The metal mesh filler 32 is corrosion resistant and is comprised of fine metal wires that are interwoven or interlaced into a three-dimensional geometry, for example an irregular spheroid, an irregular ellipsoid, a rectangular cuboid, or an elongated column. In the embodiment of FIG. 3, each vertical channel 30 includes a plurality of stacked metal mesh filler elements 32, the metal mesh filler elements extending from an intake side of the structured packing to an outlet side of the structured packing. In other embodiments however the metal mesh filler 32 comprises a single rectangular element for each vertical channel 26 of the structured packing. In still other embodiments, the structured packing 22 can comprise a three-dimensional lattice structure with the metal mesh filler 32 distributed uniformly therein.

The structured packing 22 can also have a macrostructure and/or a microstructure to achieve a desired contact angle between the $CO_2$-laden air and the solvent. As used herein, "contact angle" means the angle between the liquid-solid interface and the liquid-air interface. Low contact angles exhibit a tendency of the solvent to spread and adhere to the solid surface, whereas high contact angles exhibit a tendency of the solid surface to repel the solvent. Low contact angles (<60°) are generally preferred, as this interaction results in the solvent spreading on the surface of the packing, utilizing a higher surface area for chemical reactions.

The present invention is further described in connection with the following laboratory example, which is intended to be non-limiting.

Polyvinylchloride structured packing from Brentwood Industries (model MASSdek 80 grid) included six rows of eight hexagonal channels in a honeycomb configuration at the air entrance leading to parallel channels. Stainless steel scrubbers (model Scotch Bright Stainless-Steel Scrubbers from 3M) were disposed in the vertical channels of the structured packing (161 stainless steel scrubbers in total). The air-liquid contactor was used in the cross-flow configuration, where the K-SAR solvent and the air stream flowed perpendicular to each other. An air blower was used to deliver air at flowrates up to 100 liters per minute. An air heater from Tutco Farnham Custom Products was used to heat inlet air. Infrared sensors used to measure the concentration of $CO_2$ in the inlet air stream and the outlet air stream were purchased from $CO_2$ meter (model CM 0024). SEM-EDS was performed using a Carl Zeiss Merlin AG microanalyzer. An automated titrator (model Tirando from Metrohm) measured $CO_2$ loading in K-SAR solutions.

The contactor exhibited a total surface area of approximately 22.8 $m^2$ and a surface area to volume ratio of approximately 885 $m^2$/m3, primarily owing to the introduction of stainless steel scrubbers within channels in the polyvinylchloride structured packing. The contactor exhibited a $CO_2$ uptake efficiency of between 25% and 60% for 1M K-SAR and between 45% and 75% for 3M K-SAR. With respect to air temperature dependency, the $CO_2$ uptake efficiency increased with air temperature up to around 25° C., after which the $CO_2$ uptake efficiency plateaued. Long term $CO_2$ loading experiments were performed for 1M K-SAR. The exit gas concentration of $CO_2$ began to increase after about 6 hours of continuous loading. The pH of the contactor started at approximately 11.7 and at the end of the loading, the pH dropped to 10.4. Over the course of the long-term loading experiment, the contactor exhibited a loading of 0.8 mol $CO_2$ per liter, which translates to a $CO_2$ capture rate of 141 grams of $CO_2$ in 11 hours, or 300 grams of $CO_2$ per day. The contactor exhibited a pressure drop of about 6 Pa for a flow rate of air between 300 and 1100 liters per minute and a flow rate of solvent between 4 and 8 liters per minute. The pressure drop of only about 6 Pa indicates that the contactor has great potential as a gas-liquid contactor for a scaled up DAC process. Lastly, the corrosion resistance of the 410 stainless steel packing elements was explored using SEM-EDS and measurements of corrosion potential and total impedance. Results suggest that despite continuous exposure to K-SAR, the surface of 410 stainless steel remained unchanged. The total impedance of stainless steel was measured to be very high (>80,000 ohm $cm^2$), indicating a very low corrosion risk from exposure to K-SAR.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. An air-liquid contactor for the chemical absorption of carbon dioxide from air, the air-liquid contactor comprising:
   a structured packing defining a horizontal gas flow path extending from an inlet side thereof to an outlet side thereof, the structured packing including a plurality of vertical channels defining a vertical solvent flow path, wherein the structured packing comprises a three-dimensional polymeric structural element; and
   a metal mesh filler disposed in each of the plurality of vertical channels, wherein the metal mesh filler comprises a stainless steel wire mesh that is interwoven or interlaced into a three-dimensional geometry, wherein the metal mesh filler provides a supporting surface area to promote interaction of carbon dioxide-laden air and a solvent for the capture of carbon dioxide.

2. The air-liquid contactor of claim 1, wherein the metal mesh filler comprises 410 stainless steel.

3. The air-liquid contactor of claim 1, wherein the metal mesh filler comprises a plurality of spheroidal or ellipsoidal metal mesh filler elements disposed in the plurality of vertical channels from the inlet side of the structured packing to the outlet side of the structured packing.

4. The air-liquid contactor of claim 1, wherein the metal mesh filler comprises a plurality of unitary metal mesh filler elements disposed in corresponding ones of the plurality of vertical channels from the inlet side of the structured packing to the outlet side of the structured packing.

5. The air-liquid contactor of claim 1, wherein the structured packing comprises a cuboid, and wherein the plurality of vertical channels are oriented side-by-side within the cuboid.

6. The air-liquid contactor of claim 1, wherein the three-dimensional polymeric structural element is comprised of polyvinylchloride.

7. A direct air capture system comprising:
   the air-liquid contactor of claim 1;
   a suction source to circulate $CO_2$-laden air through the air-liquid contactor; and
   a collection basin to recover solvent flowing vertically though the air-liquid contactor.

8. The direct air capture system of claim 7, wherein the solvent comprises an aqueous amine or amino acid solution.

9. The direct air capture system of claim 7, wherein the solvent comprises potassium sarcosinate.

10. The direct air capture system of claim 7, wherein the suction source is disposed on either of an upstream-side of the air-liquid contactor or a downstream side of the air-liquid contactor.

11. A method for the removal of $CO_2$ from a dilute gas mixture, the method comprising:
   positioning a metal mesh filler within each of a plurality of vertical channels in a structured packing, wherein the metal mesh filler comprises at least one stainless steel fiber interwoven or interlaced into a three-dimensional geometry, and wherein the plurality of vertical channels are arranged side-by-side in the structured packing;

circulating a $CO_2$-laden gas through the structured packing, the $CO_2$-laden gas comprising atmospheric air or ambient air;

flowing a solvent through the structured packing in a crossflow configuration relative to the $CO_2$-laden gas flowing through the structured packing; and absorbing at least a portion of $CO_2$ from the $CO_2$-laden gas with the solvent to yield a $CO_2$-lean gas exiting from the structured packing.

12. The method of claim 11, wherein the metal mesh filler comprises 410 stainless steel.

13. The method of claim 11, wherein the metal mesh filler comprises a plurality of spheroidal or ellipsoidal metal mesh filler elements disposed within the plurality of vertical channels.

14. The method of claim 11, wherein the metal mesh filler comprises a plurality of unitary metal mesh filler elements disposed in corresponding ones of the plurality of vertical channels.

15. The method of claim 11, wherein the structured packing comprises a cuboid, and wherein the plurality of vertical channels are oriented side-by-side within the cuboid.

16. The method of claim 11, wherein the metal mesh filler defines a packing density of between 1% and 30%, inclusive.

17. The method of claim 11, wherein the structured packing is a three-dimensional polymeric structural element that is comprised of polyvinylchloride.

18. The method of claim 11, wherein the solvent comprises an aqueous amine or amino acid solution.

19. The method of claim 11, wherein the solvent comprises potassium sarcosinate.

20. The method of claim 11, further including positioning a suction source on either of an upstream-side of the structured packing or a downstream side of the structured packing.

* * * * *